United States Patent
Beged-Dov et al.

(10) Patent No.: US 6,862,588 B2
(45) Date of Patent: Mar. 1, 2005

(54) HYBRID PARSING SYSTEM AND METHOD

(75) Inventors: Gabriel Beged-Dov, Corvallis, OR (US); Stephen F. Froelich, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 438 days.

(21) Appl. No.: 09/916,040

(22) Filed: Jul. 25, 2001

(65) Prior Publication Data

US 2003/0023615 A1 Jan. 30, 2003

(51) Int. Cl.[7] .............................................. G06F 12/00
(52) U.S. Cl. ........................................ 707/3; 707/104.1
(58) Field of Search ................................. 715/513–514, 715/515–516; 707/100, 102, 104.1, 3, 10; 717/140–150, 110, 136; 709/202

(56) References Cited

U.S. PATENT DOCUMENTS

| | | | | |
|---|---|---|---|---|
| 5,528,491 A | * | 6/1996 | Kuno et al. ..................... 704/9 |
| 5,651,095 A | * | 7/1997 | Ogden ......................... 704/260 |
| 5,742,611 A | | 4/1998 | Brandin |
| 5,942,002 A | | 8/1999 | Brandin |
| 5,963,742 A | * | 10/1999 | Williams ..................... 717/143 |
| 5,970,490 A | * | 10/1999 | Morgenstern ................ 707/10 |
| 6,157,617 A | | 12/2000 | Brandin |
| 6,167,400 A | | 12/2000 | Brandin |
| 6,230,173 B1 | * | 5/2001 | Ferrel et al. ................. 715/513 |
| 6,243,844 B1 | * | 6/2001 | Tonks .......................... 714/758 |
| 6,289,382 B1 | * | 9/2001 | Bowman-Amuah ......... 709/226 |
| 6,367,068 B1 | * | 4/2002 | Vaidyanathan et al. ..... 717/143 |
| 6,374,241 B1 | * | 4/2002 | Lamburt et al. ............... 707/6 |
| 6,466,940 B1 | * | 10/2002 | Mills .......................... 707/102 |
| 6,507,856 B1 | * | 1/2003 | Chen et al. .................. 715/513 |
| 6,560,616 B1 | * | 5/2003 | Garber ........................ 707/203 |
| 6,584,480 B1 | * | 6/2003 | Ferrel et al. ................. 715/513 |
| 6,631,379 B2 | * | 10/2003 | Cox ............................ 707/100 |
| 2002/0038320 A1 | * | 3/2002 | Brook ......................... 707/513 |
| 2002/0069157 A1 | * | 6/2002 | Jordan .......................... 705/37 |
| 2002/0073399 A1 | * | 6/2002 | Golden ....................... 717/114 |
| 2002/0120652 A1 | * | 8/2002 | Rising et al. ................ 707/513 |
| 2002/0120685 A1 | * | 8/2002 | Srivastava et al. .......... 707/513 |
| 2002/0120780 A1 | * | 8/2002 | Rising et al. ................ 709/246 |
| 2002/0198974 A1 | * | 12/2002 | Shafer ......................... 709/223 |
| 2003/0028364 A1 | * | 2/2003 | Chan et al. .................... 704/1 |
| 2003/0037069 A1 | * | 2/2003 | Davison ..................... 707/200 |

OTHER PUBLICATIONS

Harris, Dave "Validation in XML", Wayback Machine [online] [Retrieved on Oct. 21, 2003] Retrieved From: wiki.cs.uiuc.edu/CampSmalltalk/Validation+in+XML.*

"Java Project X Release Notes", Wayback Machine [online] [Retrieved on Oct. 23, 2003] Retrieved From: xml.coverpages.org/javaPojectX2–RelNotes.html.*

(List continued on next page.)

*Primary Examiner*—Kim Vu
*Assistant Examiner*—Monplaisir Hamilton

(57) ABSTRACT

A system and method are provided for parsing a markup file. The present system includes a hybrid parser that employs both a lightweight parser and a heavy weight parser to parse a markup file. The lightweight parser is capable of performing a first set of parsing tasks and the heavyweight parser is capable of performing a second set of parsing tasks, where the first set of parsing tasks is a subset of the second set of parsing tasks. In addition, the hybrid parser provides for transitioning a parsing of a markup file from the lightweight parser to the heavyweight parser upon an occurrence of a transition event. A transition event is defined, for example, as the circumstance where the lightweight parser is required to perform a parsing task that is beyond its capability.

19 Claims, 6 Drawing Sheets

OTHER PUBLICATIONS

St. Lauremt, Simon "Toward a Layered Model for XML", Wayback Machine [online] [Retrieved on Oct. 23, 2003] Retrieved From: simonstl.com/artilcles/layering/layered.htm.*

Website at http://xml.apache.org/xerces–j/features.html, "General Features," The Apache XML Project, 4 pages, Apr. 12, 2001.

Website at http://xmlsoftware.com/parsers/, "XML Software," 12 pages, Mar. 27, 2001.

Website at http://neocore.com, home page for NeoCore of Colorado Springs, Colorado, 26 pages, Mar. 27, 2001.

* cited by examiner

HYBRID PARSING SYSTEM AND METHOD

TECHNICAL FIELD

The present invention is generally related to the field of data processing and, more particularly, is related to a system and method for parsing data in the form of a markup file.

BACKGROUND OF THE INVENTION

In recent years, the use of the Internet and technological development surrounding the Internet has spawned the creation of eXtensible Markup Language (XML). XML is generally regarded as a condensed form of Standard Generalized Markup Language (SGML) that allows programmers to create markup files with customized tags that offer greater flexibility in organizing and presenting information as opposed to the creation of markup files using Hypertext Markup Language (HTML). XML is essentially a specification set forth by a working group of the World Wide Web Consortium that provides rules for how XML files are to be created. XML is generally rather strict in demanding that XML files conform with the standards set forth in the specification.

Currently, many new applications are appearing on the Internet that create or receive XML files. In the typical case that an application receives an XML file, the application employs an XML parser to break down the XML file into component parts according to a format that is accessible by the application itself. For example, some XML parsers generate events based on the content of the XML file that is provided to the application. In one case, these events are formatted according to the Simple Applications Programming Interface for XML (SAX) as is generally known by those with ordinary skill in the art. Thus, a typical application can employ an XML parser to generate SAX events from the XML file. The SAX events provide the data substance contained in the XML file to the application in a recognizable format. XML parsers may also determine, for example, whether a particular XML file is "well formed" in the sense that the XML does not violate the rules that specify the creation of XML files. There are other additional tasks performed by XML parsers that are not described herein, but are generally known by those with ordinary skill in the art.

For those who are creating various applications for the Internet or other network environment, there are many different XML parsers that are available that can be plugged into the application as needed. Unfortunately, the many different XML parsers available have different capabilities in parsing XML files. In particular, the various XML parsers can have many different levels of capability with corresponding speeds of operation. For example, an XML parser of significant complexity may operate at a relatively slow pace. Conversely, an XML parser of lesser complexity with corresponding limited capability may operate at a much faster pace. Thus, it is difficult for builders of applications to obtain an XML parser that provides comprehensive parsing functionality that also operates at a relatively fast speed.

SUMMARY OF THE INVENTION

In light of the forgoing, the present invention provides for a system and a method for parsing a markup file. In one embodiment, the present invention provides for a hybrid parser that employs both a lightweight parser and a heavy weight parser to parse a markup file. The lightweight parser is capable of performing a first set of parsing tasks and the heavyweight parser is capable of performing a second set of parsing tasks, where the first set of parsing tasks is a subset of the second set of parsing tasks. In addition, the hybrid parser provides for transitioning a parsing of a markup file from the lightweight parser to the heavyweight parser upon an occurrence of a transition event. A transition event is defined, for example, as the circumstance where the lightweight parser is required to perform a parsing task that is beyond its capability. The hybrid parser provides distinct advantages in that a fast lightweight parsing is employed to parse markup files quickly. Since the majority of markup files can be parsed by a lightweight parser, then the parsing is achieved as quickly as possible. At the same time, the hybrid parser can also parse those markup files that are beyond the lightweight parser's ability by transitioning to the heavy weight parser as needed.

In other embodiment, the present invention provides for a method for parsing a markup file. In this regard, the method comprises the step of parsing a first portion of the markup file with a lightweight parser in a computer system. The lightweight parser is capable of performing a first set of parsing tasks. The present method also includes the step of parsing a second portion of the markup file with a heavyweight parser in the computer system. The heavyweight parser is capable of performing a second set of parsing tasks, wherein the first set of parsing tasks is a subset of the second set of parsing tasks. The present method further includes the step of transitioning between the parsing of the first portion of the markup file with the lightweight parser to the parsing of the second portion of the markup file with the heavyweight parser upon an occurrence of a transition event.

In another embodiment, the present invention provides for a program embodied in a computer readable medium employed to parse a markup file. In this regard, the program comprises a lightweight parser that performs a first set of parsing tasks to parse the markup file. The program also includes a heavyweight parser that performs a second set of parsing tasks to parse the markup file, wherein the first set of parsing tasks is a subset of the second set of parsing tasks. The program further includes code that transitions a parsing of the markup file from the lightweight parser to the heavyweight parser upon an occurrence of a transition event.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
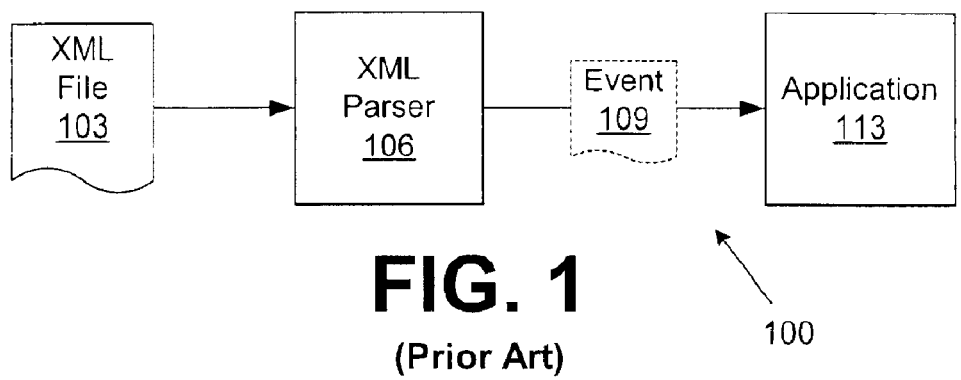
FIG. 1 is a functional block diagram of a parsing of an extensible markup language (XML) file according to the prior art.

With reference to FIG. 1, shown is a functional block diagram of a parsing flow 100 according to the prior art. As shown, the parsing flow 100 begins with an eXtensible Mark-up Language (XML) file 103 that is applied to an XML parser 106. The XML parser 106 parses the XML file 103 and generates events 109 according to the Simple Applications Programming interface for XML (SAX) or other protocol as is known by those with ordinary skill in the art. The SAX events 109 are then applied to an application 113 that may be any computer based application or system as known by those with ordinary skill in the art. The events 109 thus provide the substance of the XML file 103 in a format that is recognizable by the application 113 according to the SAX protocol.

There are many different XML parsers 106 available from a variety of resources that vary in complexity, speed of operation, and other factors. Also, there are many different tasks that may be performed by XML parsers 106. For example, one such task would be to determine whether an XML file 103 is well-formed according to the dictates of the extensible Markup Language or other comparable language. Still other tasks may include checking XML files 103 for validity or including external general entities and/or external parameter entities. Also, such tasks may include performing namespace processing in which prefixes are stripped off element and attribute names and are replaced with the corresponding namespace uniform resource indicators (URI's) or turning XML schema support on or off, etc. In addition, there are many other parsing tasks beyond those listed above that are known to those with ordinary skill in the art and, consequently, are not discussed herein in detail.

Figure 2:
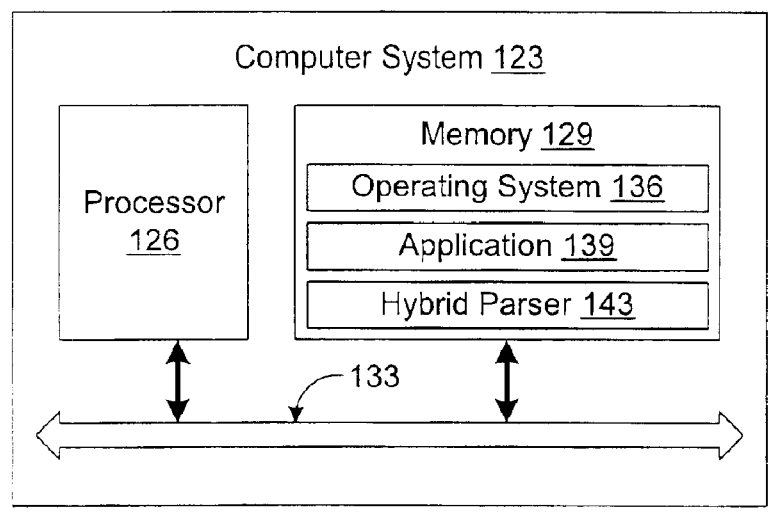
FIG. 2 is a block diagram of a computer system that employs a hybrid parser according to an aspect of the present invention.

With reference to FIG. 2, shown is a computer system 123 according to an embodiment of the present invention. The computer system 123 includes a processor circuit with a processor 126 and a memory 129, both of which are coupled to a local interface 133. The local interface 133 may be, for example, a data bus with an accompanying control/address bus as is generally known by those with ordinary skill in the art. Stored on the memory 129 and executable by the processor 126 are an operating system 136, an application 139, and a hybrid parser 143. According to the present invention, the hybrid parser 143 is executed by the processor 126 to parse an XML file 103 (FIG. 1) to generate the events 109 (FIG. 1) for the application 139. The particular operation of the hybrid parser 143 will be described with reference to later figures. In the context of the present invention, the XML file 103 is representative of various types of markup files that may be parsed by the hybrid parser 143. Thus, the XML file 103 may comprise markup files that are created using languages other than XML such as HyperText Markup Language (HTML), etc.

The XML file 103 may be received by the computer system 123 via a network such as, for example, the Internet, wide area networks (WANs), local area networks, or other suitable networks, etc., or any combination of two or more such networks. In this sense, the computer system 123 may be coupled to a network in any one of a number of ways to facilitate data communication to and from devices linked to the network as is generally known by those of ordinary skill in the art. For example, the computer system 123 may be linked to a network through various devices such as, for example, network cards, modems, or other such communications devices. The networks may range from common, general purpose technologies, such as Ethernet, to more specialized communications technologies, including, but not limited to Fibre Channel, Small Computer System Interface (SCSI), S-Bus, Myranet and others known to those with ordinary skill in the art.

Also, the computer system 123 may include various peripheral devices. These peripheral devices may include, for example, keyboards, keypads, touch pads, touch screens, microphones, scanners, mice, joysticks, or one or more push buttons, etc. The peripheral devices may also include display devices, indicator lights, speakers, printers, etc. Specific display devices may be, for example, cathode ray tubes (CRT), a liquid crystal display screens, a gas plasma-based flat panel displays, light emitting diodes, etc.

In addition, the memory 129 may include both volatile and nonvolatile memory components. Volatile components are those that do not retain data values upon loss of power. Nonvolatile components are those that retain data upon a loss of power. Thus, the memory 129 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

The processor 126 may represent multiple processors and the memory 129 may represent multiple memories that operate in parallel. In such a case, the local interface 133 may be an appropriate network that facilitates communication between any two of the multiple processors or between any processor and any of the memories, etc. The local interface 133 may facilitate memory to memory communication as well. The processor 126 may be electrical or optical in nature.

The operating system 136 is executed to control the allocation and usage of hardware resources in the computer system 123. Specifically, the operating system 136 controls the allocation and usage of the memory 129, processing time, and the peripheral devices as well as performing other functionality. In this manner, the operating system 129 serves as the foundation on which applications depend as is generally known by those with ordinary skill in the art.

Figure 3:
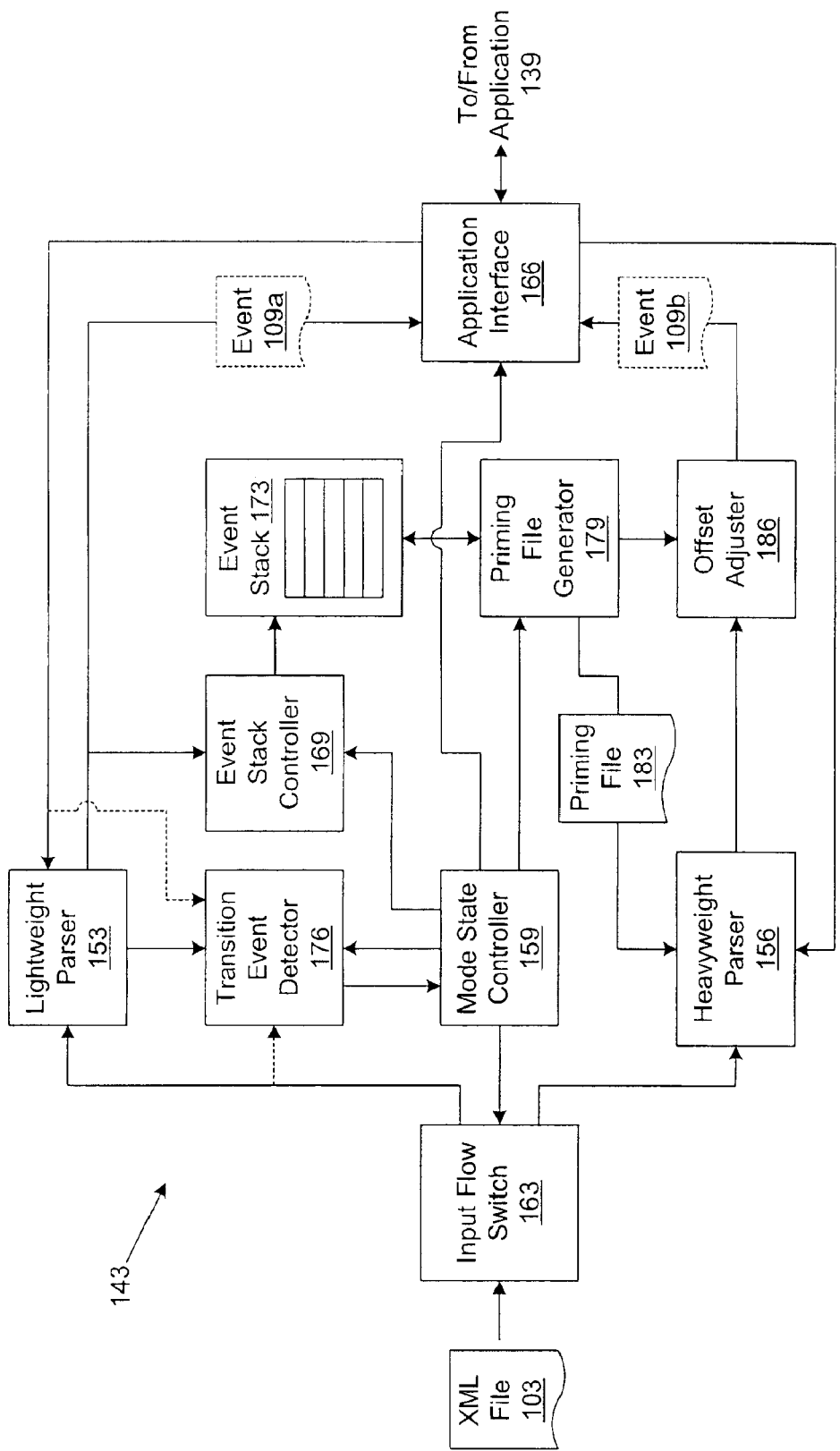
FIG. 3 is a functional block diagram of the hybrid parser of FIG. 2.

With reference to FIG. 3, shown is a functional block diagram of the hybrid parser 143 according to an aspect of the present invention. As shown in FIG. 3, each block represents a module, object, or other grouping or encapsulation of underlying functionality as implemented in programming code. However, the same underlying functionality may exist in one or more modules, objects, or other groupings or encapsulations that differ from those shown in FIG. 3 without departing from the present invention as defined by the appended claims.

The hybrid parser 143 advantageously employs a lightweight parser 153 and a heavyweight parser 156 in order to process the XML file 103 to generate appropriate events 109a and/or 109b. The hybrid parser 143 operates in one of three different modes. In a first or "lightweight" mode, the XML file 103 is processed by the lightweight parser 153, thereby generating the events 109a that are applied to the application 139. In a second or "transition" mode, the hybrid parser 143 transitions the processing of the XML file 103 from the lightweight parser 153 to the heavyweight parser 156. To affect this transition, several different components are employed as will be described. In the third or "heavyweight" mode, the hybrid parser 143 processes the XML file 103 with the heavyweight parser 156 thereby generating the events 109b that are supplied to the application 139.

The lightweight parser 153 is capable of performing a first set of parsing tasks in order to parse the XML file 103. The heavyweight parser 156 is a more comprehensive parser that is capable of performing a second set of parsing tasks to parse the XML file 103. Relative to each other, the first set of parsing tasks is a subset of the second set of parsing tasks. Since the lightweight parser 153 performs a limited number of parsing tasks, then it operates much more quickly than the heavyweight parser 156 that is much more comprehensive in its operation. Also, the lightweight parser 153 is likely to occupy a smaller amount of random access memory (RAM) or other comparable memory component when executed.

The transition between the lightweight parser 153 and the heavyweight parser 156 in the second mode of operation of the hybrid parser 143 is undertaken upon an occurrence of a transition event. A transition event may be, for example, when the lightweight parser 153 encounters an XML file 103 of such complexity requiring the lightweight parser 153 to perform a parsing task that is beyond the first set of parsing tasks performed by the lightweight parser 156. The transition event may also be a request from the application 139 for parsing tasks that are not included within the realm of capability of the lightweight parser 153. In such case, the parsing of the XML file 103 is transitioned from the lightweight parser 153 to the heavyweight parser 156. The heavyweight parser 156 can then complete the parsing of the XML file 103 using its greater capabilities. In some cases, the transition event may occur even before the lightweight parser 153 begins to parse the XML file 103 so that the heavyweight parser 156 parses the entire XML file 103 by itself.

With the foregoing in mind, in the following discussion, reference is made to other components of the hybrid parser 143 that serve to provide the functionality necessary to effect the operation of the hybrid parser 143. In this sense, the hybrid parser 143 includes a mode state controller 159 that determines the precise mode among the three operating modes of the hybrid parser 143 previously mentioned. The hybrid parser 143 also includes an input flow switch 163 and an application interface 166. The mode state controller 159 communicates with the input flow switch 163 to direct statements from the XML file 103 to either the lightweight parser 153 or the heavyweight parser 156 for parsing depending on the particular mode that the hybrid parser 143 is in at a given moment. Similarly, the mode state controller 159 communicates with the application interface 166 to direct any events 109a or 109b generated by the lightweight parser 153 or the heavyweight parser 156, respectively, to the application 139. Also, the application interface 166 directs any requests that are received from the application 139 in the reverse direction to the lightweight parser 153 or the heavyweight parser 156, depending on the current operating mode of the hybrid parser 143. Thus, the input flow switch 163 and the application interface 166 serve as the portals through which the hybrid parser 143 interfaces with the application 139 as well as other applications, etc.

Thus, in the lightweight mode, the mode state controller 159 establishes a channel via the input flow switch 163 that applies the XML file 103 to the lightweight parser 153. The events 109a generated by the lightweight parser 153 are directed to the application 139 by the application interface 166. In the heavyweight mode, the mode state controller 159 establishes a channel using the input flow switch 163 and the application interface 166 applying the XML file 103 to the heavyweight parser 156 and the events generated therefrom to the application 139.

The hybrid parser 143 also includes an event stack controller 169 that maintains an event stack 173. The event stack controller 169 places so called "open" events 109a into the event stack 173. The event stack controller 169 also deletes open events 109a stored in the event stack 173 upon obtaining a matching close event 109a. In this manner, the event stack 173 maintains all of the current open events 109a while the lightweight parser 153 is parsing the XML file 103. In this context, an event 109a is considered "closed" when the application 139 signals that such event has been consumed or processed by the application 139. Until that time, events 109a are considered "open".

The hybrid parser 143 also includes a transition event detector 176 that is executed to detect a transition event thereby placing the hybrid parser 143 in the transition mode. The transition event detector 176 can detect the existence of a transition event by examining either the statements from the XML file 103 that are applied to the lightweight parser 153, or by examining the events 109a that are generated by the lightweight parser 153. Either the input statements or the events 109a would reveal whether the lightweight parser 153 is capable of parsing the particular content in question. Alternatively, the function of signaling the existence of a transition event may be performed by the lightweight parser 153 itself. For example, upon encountering statements from the XML file 103 that can not be parsed given the capabilities of the lightweight parser 153, the lightweight parser 153 may then signal directly to the mode state controller 159 that a transition is necessary as the XML file 103 can not be parsed accordingly.

The hybrid parser 143 also includes a priming file generator 179 according to another aspect of the present invention. The priming file generator 179 generates a priming file 183 upon an occurrence of the transition event. The priming file 183 is applied to the heavyweight parser 156 to prime the heavyweight parser 156 in synchronization with the operation of the lightweight parser 153. Specifically, until the transition to the heavyweight parser 156, the XML file 103 is parsed by the lightweight parser 153. During the parsing of the XML file 103 by the lightweight parser 153, appropriate events 109a are transmitted to the application 139 from a lightweight parser 153 via the application interface 166. Upon transitioning to the heavyweight parser 156, the remaining portion of the XML file 103 is parsed by the heavyweight parser 156.

However, since the heavyweight parser 156 did not parse the first portion of the XML file 103, it is not aware of any current open tags from the XML file 103 that remain open for which corresponding open events 109a have been generated by the lightweight parser 153 in parsing the first portion of the XML file 103. Consequently, it is necessary to make the heavyweight parser 156 aware of the current open tags from the XML file 103. To do this, all open events generated by the lightweight parser 153 from the open tags are stored in the event stack 173. Upon an occurrence of a transition event, the priming file 183 is generated by the priming file generator 179 from the open events currently stored in the event stack 173. In particular, the priming file generator 179 generates the corresponding open XML tags from the open events stored in the event stack 173. The open XML tags are placed in the priming file 183 and then applied to the heavyweight parser 156. In this manner, the heavyweight parser 156 is primed to begin to parse the XML file 103 where the lightweight parser 153 left off. Specifically, it sees all of the open tags in the XML file 103 that correspond with close tags that have yet to be parsed.

Also, since the heavyweight parser 156 begins parsing in the middle of the XML file 103, it does not know which line in the XML file 103 that it is actually parsing when it begins after being primed. This information may be included in the events 109b as a line indicator to inform the application 139 of where a particular event 109b originates in the XML file 103. In order to remedy this problem, the priming file generator 179 provides an event offset to the offset adjuster 186. The event offset takes into account the portion of the XML file 103 that has been parsed by the lightweight parser 153. When the heavyweight parser 156 generates the events 109b with its own line indicator, the offset adjuster 186 adjusts this line indicator by adding the offset thereto. In this manner, the line indicators in the events 109b generated by the heavyweight parser 156 are sequential to the line indicators in the events 109a generated from the lightweight parser 153.

Thus, when a transition event occurs the mode state controller 159 causes the priming file generator 179 to generate the priming file 183 including all of the open tags in the event stack 173. Since the event stack 173 includes the events 109a that have been generated by the lightweight parser 153, the priming file generator 179 first translates these open events into the original corresponding XML statements from the XML file 103. These statements are then included in the priming file 183 that is fed to the heavyweight parser 156. Since these events 109a were previously generated by the lightweight parser 153 and transmitted to the application 139, the application interface 166 is directed by the mode state controller 159 to disregard the events 109b that are generated by the heavyweight parser 156 in response to the application of the priming file 183 thereto. This prevents the application 139 from obtaining copies of these open events, thereby preventing confusion on the part of the application 139.

The hybrid parser 143 provides significant advantages over the parsers employed according to the prior art. For example, for a majority of XML files 103, speedy parsing with minimal use of memory may be achieved using the lightweight parser 153. However, the hybrid parser 143 also includes the comprehensive parsing functionality of the heavyweight parser 156 when such functionality is necessary. In addition, the design of the hybrid parser 143 is modular in nature, thereby providing for the easy upgrade of the hybrid parser 143 as the art advances.

Figure 4:
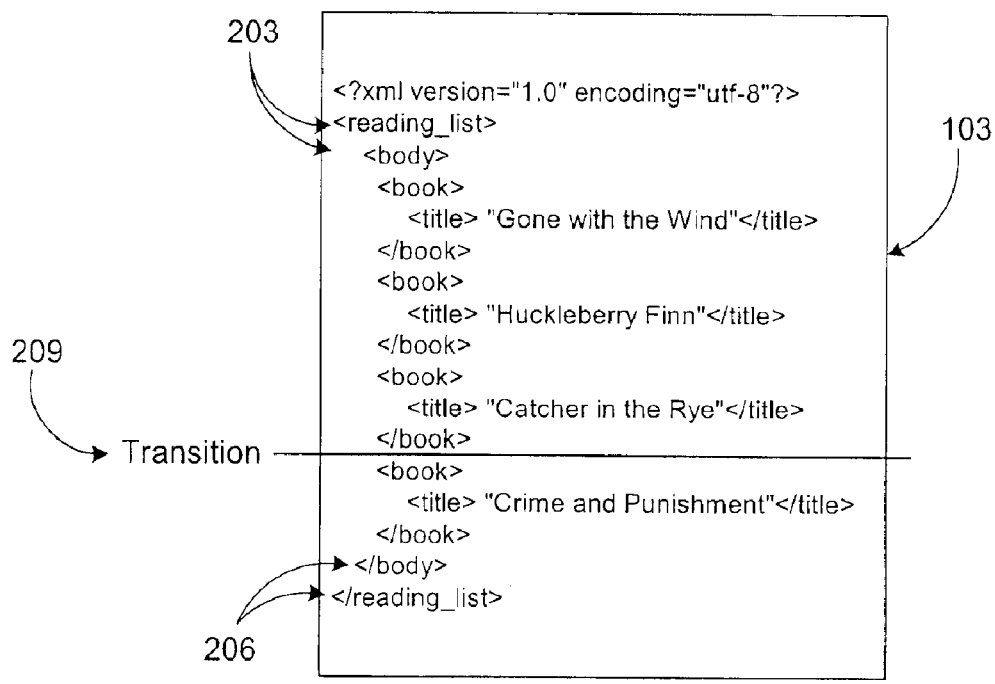
FIG. 4 is a drawing of an example of an XML file processed by the hybrid parser of FIG. 2.

Referring then, to FIG. 4, shown is an example of an XML file 103 according to an aspect of the present invention. The XML file 103 includes a number of open tags 203 and a number of close tags 206. As shown in FIG. 4, a first portion of the XML file is parsed by the lightweight parser 153, assuming that a transition event occurred at the transition point 209. Thereafter, the heavyweight parser 156 parses the XML file 103.

Figure 5:
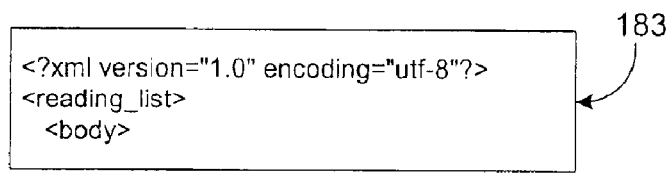
FIG. 5 is a drawing of a priming file generated by the hybrid parser of FIG. 2.

With reference to FIG. 5, shown is an example of a priming file 183 that is generated upon the transition 209 (FIG. 4) that occurred with reference to the XML file 103 (FIG. 4) as described previously. As noted, the priming file 183 includes all of the open tags that exist up to the transition point 209 in the XML file 103 during a transition from a lightweight parser 153 to the heavyweight parser 156. These open tags are generated from the corresponding open event tags 109a stored in the event stack 173.

Figure 6:
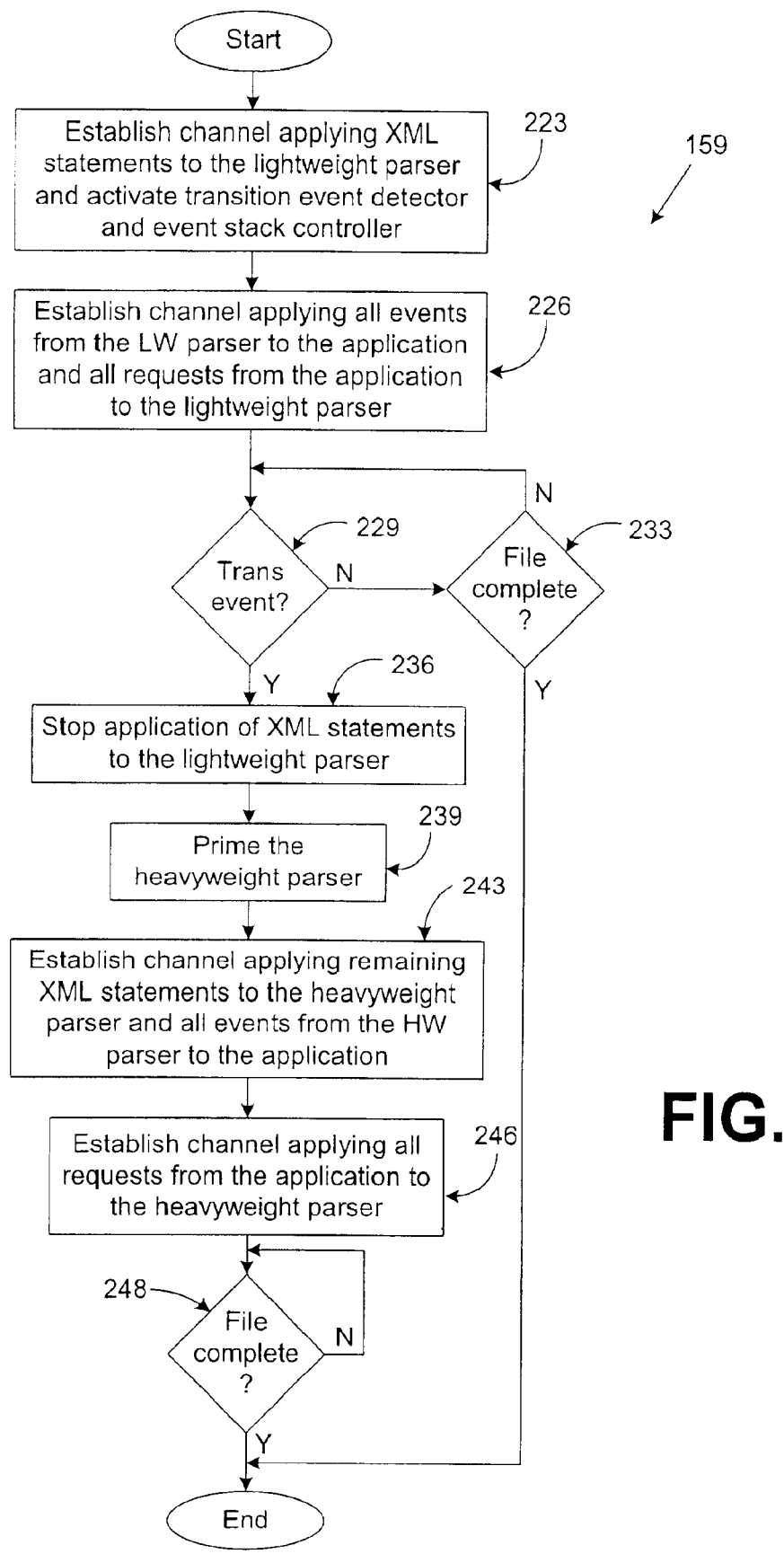
FIG. 6 is a flow chart of logic executed as a portion of the hybrid parser of FIG. 3 to control a mode of operation of the hybrid parser.

Referring next to FIG. 6, shown is a flow chart of the mode state controller 159 according to an aspect of the present invention. Alternatively, the flow chart of FIG. 6 may be viewed as depicting steps in a method implemented in the hybrid parser 143 (FIG. 3). The mode state controller 159 is executed by the processor 126 (FIG. 2) as a portion of the hybrid parser 143 to control the switching between the various modes by directing the operation of the various functions associated with each of the modes, respectively.

Beginning with block 223, the mode state controller 159 establishes a channel that applies the XML file 103 (FIG. 3) to the lightweight parser 153 (FIG. 3). Also, the transition event detector 176 (FIG. 3) and the event stack controller 169 (FIG. 3) are activated so as to perform their functions during the parsing of the XML file 103 by the lightweight parser 153. The mode state controller 159 then proceeds to block 226 in which the application interface 166 (FIG. 3) is employed to establish a channel applying all events 109a (FIG. 3) generated by the lightweight parser 153 to the application 139 (FIG. 3). Also, all requests from the application 139 are routed by the application interface 166 to the lightweight parser 153. The requests that are routed to the lightweight parser 153 may also be applied to the transition event detector 176 in the event that the transition event detector 176 can detect a transition event from the requests. Such would be the case if the application 139 requests various operations from the lightweight parser 153 that the lightweight parser 153 cannot provide.

Thereafter, the mode state controller 159 proceeds to block 229 in which it is determined whether a transition event has occurred. If not, then the mode state controller proceeds to block 233. On the other, if a transition event occurs in block 229 then the mode state controller 159 proceeds to block 236. In block 233, the mode state controller 159 determines whether the complete XML file 103 has been processed by the lightweight parser 153. If such is the case then the mode state controller 159 ends. On the other hand, if a portion of the XML file 103 remains to be parsed then the mode state controller 159 reverts back to block 229.

Assuming that a transition event has occurred in block 229, then the mode state controller 159 proceeds to block 236. In block 236, the application of the XML file 103 to the lightweight parser 153 is stopped. Thereafter, in block 239, the heavyweight parser 156 is primed so that the heavyweight parser 156 begins parsing the XML file 103 where the lightweight parser 153 left off. In particular, the priming of the heavyweight parser 156 comprises exposing the heavyweight parser 156 to those open tags corresponding to open events stored in the event stack 173. The particular function of the priming file generator 179 in this regard is discussed with reference to later figures.

After the heavyweight parser 156 is synchronized in block 239, the mode state controller proceeds to block 243 in which a channel is established that applies the remaining XML statements from the XML file 103 to the heavyweight parser 156. This may be accomplished by transmitting an appropriate statement from the mode state controller 159 to the input flow switch 163. In addition, in block 243, all events generated by the heavyweight parser 156 are applied to the application 139 through the offset adjuster 186 and the application interface 166. In particular, the mode state controller 159 can cause the application interface 166 to direct events 109b received from the heavyweight parser 156 to the application 139. Then, the mode state controller 159 proceeds to block 246 in which the application interface 166 is directed to establish a channel applying all requests from the application 139 to the heavyweight parser 156. To the extent necessary, these requests may be passed to the offset adjuster 186 so that any correct line indicator associated with such requests is properly adjusted to accord with the operation of the heavyweight parser 156.

Thereafter, the mode state controller 159 proceeds to block 248 to wait for the heavyweight parser 156 to finish parsing the remaining portion of the XML file 103. When the remaining portion of the XML file 103 has been parsed by the heavyweight parser 156, then the mode state controller 159 ends. In cases where XML files 103 are streamed in succession through the hybrid parser 143, when the end of the XML file 103 is reached and the mode state controller 159 ends accordingly, the hybrid parser 143 is reset for the next XML file 103.

Figure 7:
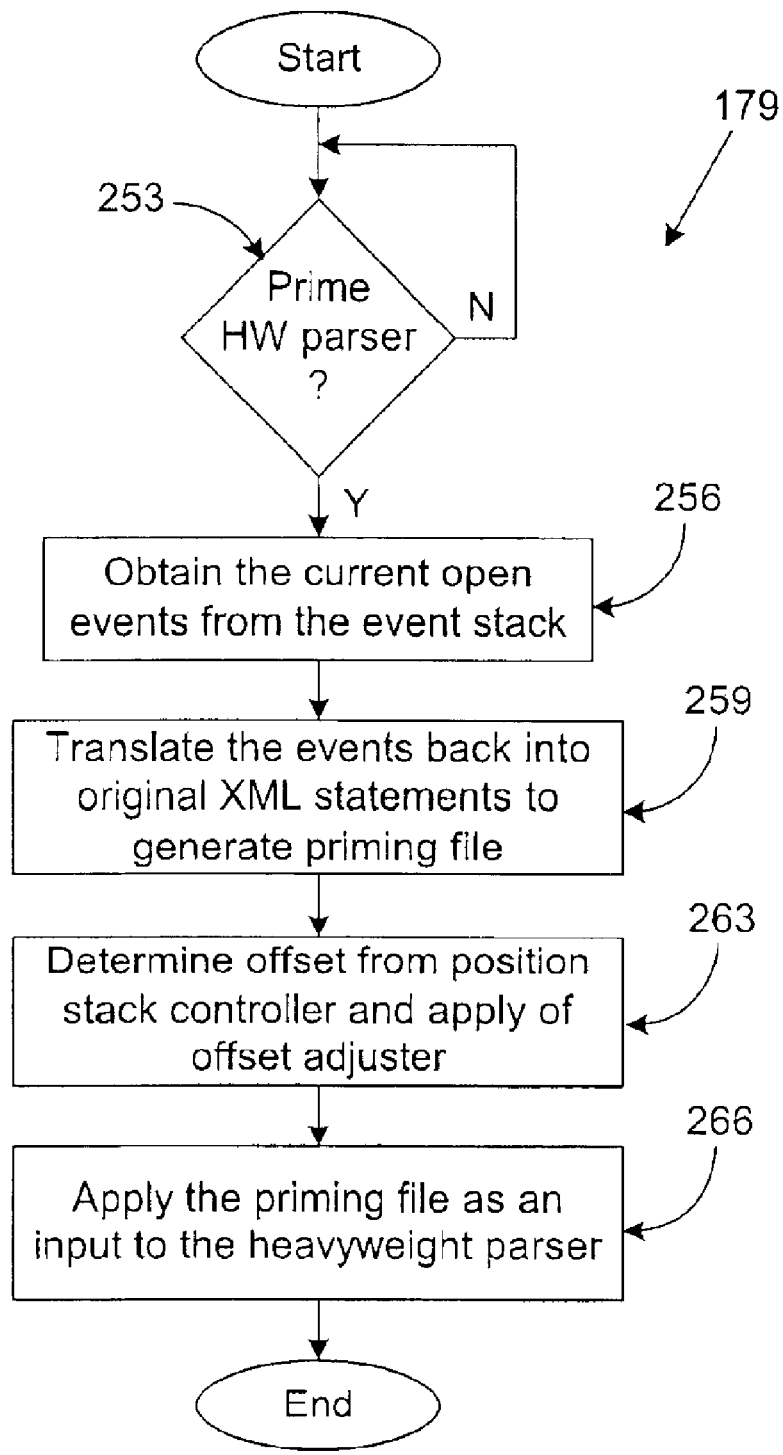
FIG. 7 is a flow chart of logic executed as a portion of the hybrid parser of FIG. 3 to generate the priming file of FIG. 5.

With reference to FIG. 7, shown is a flow chart of the priming file generator 179 according to another aspect of the present invention. Alternatively, the flow chart of FIG. 7 may be viewed as depicting the steps in a method to prime the heavyweight parser 156 (FIG. 3). In this respect, the priming file generator 179 begins with block 253 in which it is determined whether the heavyweight parser 156 is to be primed. This is determined, for example, the mode state controller 159 (FIG. 3) indicates that a transition event has occurred. Thereafter, the priming file generator 179 proceeds to block 256 in which the current open events stored in the event stack 173 (FIG. 3) are obtained from the event stack 173. Thereafter in block 259 the open events obtained from the event stack 173 are translated back into the original XML statements obtained from the XML file 103 (FIG. 3) in order to generate the priming file 183 (FIG. 3).

The priming file generator 179 then moves onto block 263 in which the current position value generated by the lightweight parser 153 that delineates the particular position in the XML file 103 that the lightweight parser has reached is obtained from the lightweight parser 153. Based on the number of open tags in the event stack 173 and the position value obtained from the lightweight parser 153, the priming file generator 179 generates and applies the offset to the offset adjuster 186 (FIG. 2). Finally, in block 266, the priming file generator 179 applies the priming file 183 as an input to the heavyweight parser 156. Thereafter the priming file generator 179 ends.

The operation of the priming file generator 179 provides one advantage in that the function of translating the open events in the events stack 173 into corresponding open XML tags is not performed unless there is a need to transition to the heavyweight parser 156. Thus, if a particular XML file 103 can be processed entirely by the lightweight parser 153, then no such translation occurs, thereby saving on processing time.

Referring back to FIG. 3, while the priming file 183 is applied as an input to the heavyweight parser 156, the heavyweight parser 156 generates events 109b that are ultimately applied to the application 139 through the application interface 166. However, it is not desirable that the events generated by the heavyweight parser 156 in parsing the priming file 183 be applied to the application 139 because the application 139 has already seen these events having been generated previously by the lightweight parser 153. Consequently, receiving repeats of the open events 109b from the priming file 183 would cause confusion on the part of the application 139. To remedy this, the application interface 166 includes functionality to discard the events 109b generated from the priming file 183. This functionality is executed when the mode state controller 159 informs the application interface 166 that the hybrid parser 143 is in transition mode.

Figure 8:
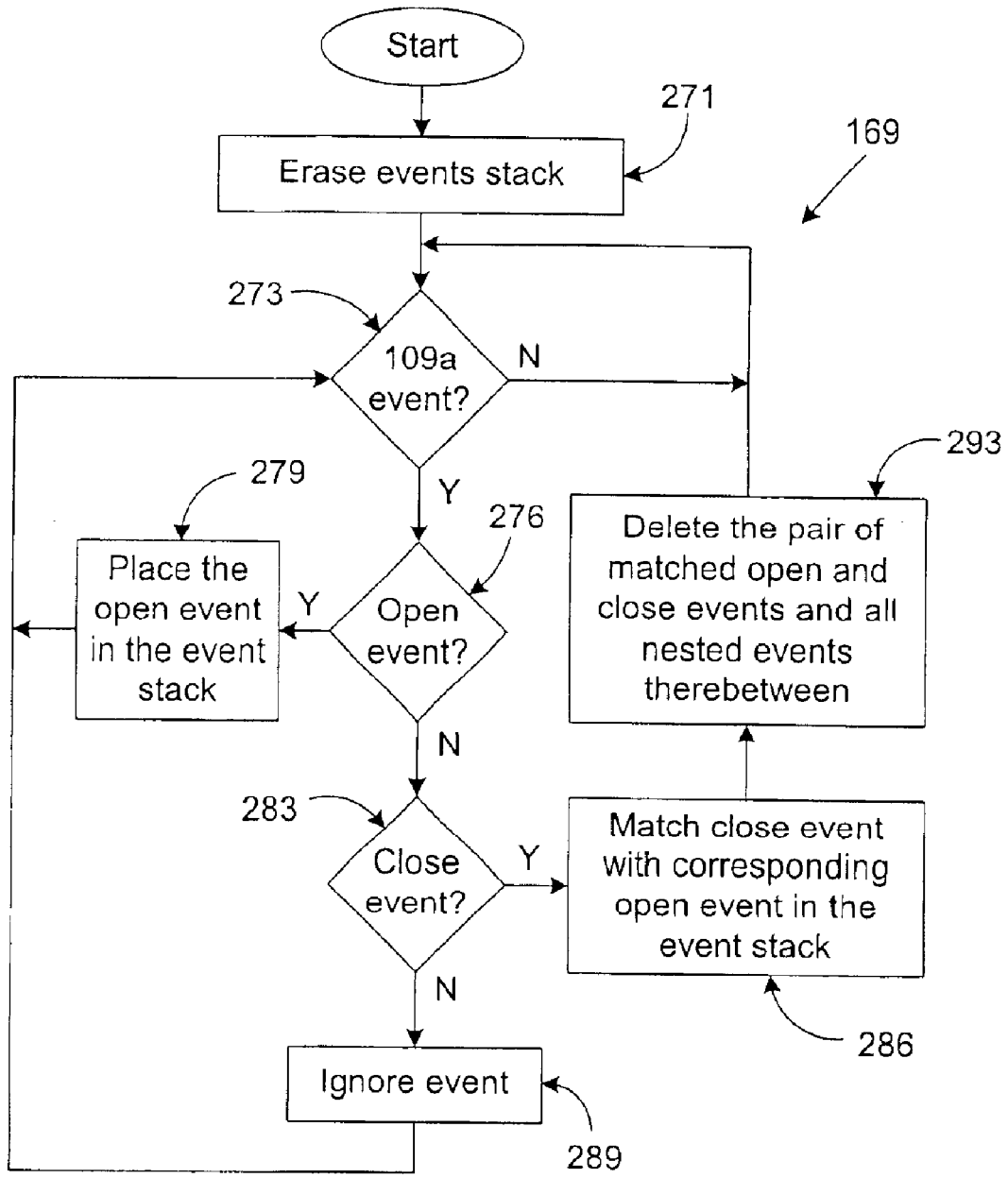
FIG. 8 is a flow chart of logic executed as a portion of the hybrid parser of FIG. 3 to maintain an event stack employed in the hybrid parser.

Turning then to FIG. 8, shown is a flow chart of the event stack controller 169 according to an aspect of the present invention. Alternatively, FIG. 8 may be viewed as depicting steps of a method implemented in the hybrid parser 143. The event stack controller 169 is executed as a portion of the hybrid parser 143 to maintain all open events in the event stack 173. This is done so as to maintain a list of the open events for use in priming the operation of the heavyweight parser 156 should a transition from the lightweight parser 153 to the heavyweight parser 156 (FIG. 1) occur.

Beginning with block 271, the events stack 173 is flushed to erase any unwanted events stored therein. Then, in block 273, the event stack controller 169 waits for an event 109a (FIG. 1) to be generated by the lightweight parser 153. When this happens, the event stack controller 169 proceeds to block 276 in which it is determined whether the event 109a that was generated by the lightweight parser 156 is an open event corresponding with an open tag in the XML file 103 (FIG. 3). If such is the case then the event stack controller 169 proceeds to block 279. Otherwise, the event stack controller 169 moves to block 283.

In block 279, the open event is placed in the event stack 173 (FIG. 3). Thereafter, the event stack controller 169 reverts back to block 273 as shown. Assuming that the event 109a was not an open event as determined in block 276, the event stack controller 169 proceeds to block 283 in which it determines whether the event 109a is a close event. If so, then the event stack controller 169 moves to block 286. Otherwise, the event stack controller proceeds to block 289. Assuming that the event stack controller 169 detects a close event in block 286, the close event is matched with the corresponding open event currently stored in the event stack 173. Thereafter, the event stack controller 169 proceeds to block 293 in which the pair of open and close events that were matched are deleted. In addition, any events that were nested between the open event in the event stack 173 and the close event matched therewith are deleted as well. The event stack controller 169 then reverts back to block 273.

Assuming that a close event was not detected in block 283, the event stack controller 169 proceeds to block 289 in which the event 109a is ignored. Thereafter the event stack controller 169 reverts back to block 273 to wait for the next event 109a to be generated by the lightweight parser 153.

Although the hybrid parser 143 (FIG. 3) of the present invention is embodied in software or code executed by general purpose hardware as discussed above, as an alternative the hybrid parser 143 may also be embodied in dedicated hardware or a combination of software/general purpose hardware and dedicated hardware. If embodied in dedicated hardware, the hybrid parser 143 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc.

Such technologies are generally well known by those skilled in the art and, consequently, are not described in detail herein.

The block diagrams and/or flow charts of FIGS. 2, 3, and 6–8 show the architecture, functionality, and operation of an implementation of the hybrid parser 143. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the block diagrams and/or flow charts of FIGS. 2, 3, and 6–8 show a specific order of execution, it is understood that the order of execution may differ from that which is depicted. For example, the order of execution of two or more blocks may be scrambled relative to the order shown. Also, two or more blocks shown in succession in FIGS. 6–8 may be executed concurrently or with partial concurrence. In addition, any number of other counters, state variables, warning semaphores, or messages might be added to the logical flow described herein, for purposes of enhanced useability, accounting, performance measurement, or providing troubleshooting aids, etc. It is understood that all such variations are within the scope of the present invention. Also, the block diagrams and/or flow charts of FIGS. 2, 3, and 6–8 are relatively self-explanatory and are understood by those with ordinary skill in the art to the extent that software and/or hardware can be created by one with ordinary skill in the art to carry out the various logical functions as described herein.

Also, where the hybrid parser 143 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the hybrid parser 143 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact disks. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

We claim:

1. A method for parsing a markup file, comprising:
   parsing a first portion of the markup file with a lightweight parser in a computer system, the lightweight parser being capable of performing a first set of parsing tasks;
   parsing a second portion of the markup file with a heavyweight parser in the computer system, the heavyweight parser being capable of performing a second set of parsing tasks, wherein the first set of parsing tasks is a subset of the second set of parsing tasks;
   detecting an occurrence of a transition event, the transition event comprising a requirement that the lightweight parser perform a parsing task excluded from the first set of parsing tasks; and
   transitioning between the parsing of the first portion of the markup file with the lightweight parser to the parsing of the second portion of the markup file with the heavyweight parser upon the occurrence of the transition event.

2. The method of claim 1, wherein the step of parsing a first portion of the markup file with a lightweight parser further comprises establishing a channel applying the first portion of the markup file to the lightweight parser and directing a number of events generated by the lightweight parser to an application.

3. The method of claim 1, wherein the step of parsing a second portion of the markup file with a heavyweight parser further comprises establishing a channel to apply the second portion of the markup file to the heavyweight parser and to direct events generated by the heavyweight parser to an application.

4. The method of claim 1, further comprising maintaining an events stack in the computer system, the events stack having a number of open events from the lightweight parser.

5. The method of claim 4, wherein the step of maintaining an events stack in the computer system, further comprising:
   storing a number of open events from the lightweight parser in the events stack;
   matching a closing event with one of the opening events in the events stack; and
   deleting the opening event matching the closing event from the event stack.

6. The method of claim 4, wherein the step of transitioning between the parsing of the first portion of the markup file with the lightweight parser to the parsing of the second portion of the markup file with the heavyweight parser further comprises:
   generating a priming file from the events stored in the events stack; and applying the priming file to the heavyweight parser.

7. The method of claim 6, wherein the step of transitioning between the parsing of the first portion of the markup file with the lightweight parser to the parsing of the second portion of the markup file with the heavyweight parser further comprises discarding a number of priming events generated by the heavyweight parser upon the application of the priming file thereto.

8. A program embodied in a computer readable medium employed to parse a markup file, comprising:
   a lightweight parser that performs a first set of parsing tasks to parse the markup file;
   a heavyweight parser that performs a second set of parsing tasks to parse the markup file, wherein the first set of parsing tasks is a subset of the second set of parsing tasks; and code that transitions a parsing of the markup file from the lightweight parser to the heavyweight parser upon an occurrence of a transition event, wherein the transition event further comprises a requirement that the lightweight parser perform a parsing task excluded from the first set of parsing tasks.

9. The program embodied in the computer readable medium of claim 8, further comprising code that establishes a channel that applies the first portion of the markup file to the lightweight parser and that directs a number of events generated by the lightweight parser to an application.

10. The program embodied in the computer readable medium of claim 8, further comprising code that establishes a channel applies the second portion of the markup file to the heavyweight parser and that directs events generated by the heavyweight parser to an application.

11. The program embodied in the computer readable medium of claim 8, further comprising code that maintains an events stack in a memory, wherein a number of open events from the lightweight parser are stored in the events stack.

12. The program embodied in the computer readable medium of claim 11, wherein the code that maintains the events stack in the memory, further comprises:

code that stores a number of open events from the lightweight parser in the events stack;

code that matches a closing event with one of the opening events in the events stack; and code that deletes the opening event matching the closing event from the event stack.

13. The program embodied in the computer readable medium of claim 11, wherein the code that transitions the parsing of the markup file from the lightweight parser to the heavyweight parser further comprises:

code that generates a priming file from the events stored in the events stack; and code that applies the priming file to the heavyweight parser.

14. The program embodied in the computer readable medium of claim 13, wherein the code that transitions the parsing of the markup file from the lightweight parser to the heavyweight parser further comprises code that discards a number of priming events generated by the heavyweight parser upon the application of the priming file thereto.

15. A system for parsing a markup file, comprising:

first means for parsing the markup file employing a first set of parsing tasks;

second means for parsing the markup file employing a second set of parsing tasks, wherein the first set of parsing tasks is a subset of the second set of parsing tasks;

and means for transitioning a parsing of the markup file from the first means to the second means upon an occurrence of a transition event, wherein the transition event further comprises a requirement that the first means perform a parsing task excluded from the first set of parsing tasks.

16. The system of claim 15, further comprising means for establishing a channel applying the first portion of the markup file to the lightweight parser and directing a number of events generated by the lightweight parser to an application.

17. The system of claim 15, further comprising means for establishing a channel applying the second portion of the markup file to the heavyweight parser and directing events generated by the heavyweight parser to an application.

18. A method for parsing a markup file, comprising:

parsing the markup file with a lightweight parser in a computer system, the lightweight parser being capable of performing a first set of parsing tasks;

maintaining an events stack in the computer system by storing a number of open events generated by the lightweight parser in the events stack and deleting select ones of the open events previously stored in the events stack that match corresponding ones of a number of closing events generated by the lightweight parser;

detecting an occurrence of a transition event in the computer system, the transition event comprising a requirement that the lightweight parser perform a parsing task excluded from the first set of parsing tasks; and transitioning from the parsing of the markup file with the lightweight parser to parsing the markup file with the heavyweight parser in the computer system upon an occurrence of the transition event by:

ceasing an application of the markup file to the lightweight parser;

generating a priming file from the current ones of the events stored in the events stack and applying the priming file to the heavyweight parser; and discarding a number of priming events generated by the heavyweight parser upon the application of the priming file thereto; and parsing a remaining portion of the markup file with the heavyweight parser after the application of the priming file, the heavyweight parser being capable of performing a second set of parsing tasks, wherein the first set of parsing tasks is a subset of the second set of parsing tasks.

19. A system for parsing a markup file, comprising:

a processor circuit having a processor and a memory;

a hybrid parser stored in the memory and executable by the processor, the hybrid parser comprising:

a lightweight parser that performs a first set of parsing tasks to parse the markup file;

a heavyweight parser that performs a second set of parsing tasks to parse the markup file, wherein the first set of parsing tasks is a subset of the second set of parsing tasks;

an events stack stored in the memory;

logic that maintains the events stack by storing a number of open events generated by the lightweight parser in the events stack and deleting select ones of the open events previously stored in the events stack that match corresponding ones of a number of closing events generated by the lightweight parser; and logic that transitions a parsing of the markup file from the lightweight parser to the heavyweight parser upon an occurrence of a transition event comprising:

logic that ceases applying the markup file to the lightweight parser;

logic that generates a priming file from the current ones of the events stored in the events stack and applies the priming file to the heavyweight parser;

logic that discards a number of priming events generated by the heavyweight parser upon the application of the priming file thereto; and logic that applies a remaining portion of the markup file to the heavyweight parser after the application of the priming file.

* * * * *

UNITED STATES PATENT AND TRADEMARK OFFICE
CERTIFICATE OF CORRECTION

PATENT NO. : 6,862,588 B2
DATED : March 1, 2005
INVENTOR(S) : Beged-Dov et al.

It is certified that error appears in the above-identified patent and that said Letters Patent is hereby corrected as shown below:

Column 2,
Line 17, delete "other" and insert -- another --.

Column 12,
Line 46, delete "event" and insert -- events --.

Column 13,
Line 32, delete "event" and insert -- events --.

Signed and Sealed this

Tenth Day of January, 2006

JON W. DUDAS
*Director of the United States Patent and Trademark Office*